US012249208B2

(12) United States Patent
Idris et al.

(10) Patent No.: US 12,249,208 B2
(45) **Date of Patent: *Mar. 11, 2025**

(54) ELECTRONIC GAMING MACHINE WITH WIRELESS COMMUNICATION CAPABILITIES

(71) Applicant: IGT, Las Vegas, NV (US)

(72) Inventors: Fayez Idris, Dieppe (CA); Stefan Keilwert, St. Josef (AT); Sven Aurich, Schwanberg (AT); David Froy, Jr., Lakeville-Westmorland (CA); Michael Russ, Styria (AT); David Small, Moncton (CA); Yue Hang Tang, Riverview (CA)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,463

(22) Filed: Aug. 16, 2023

(65) Prior Publication Data

US 2023/0394913 A1 Dec. 7, 2023

Related U.S. Application Data

(63) Continuation of application No. 17/548,936, filed on Dec. 13, 2021, now Pat. No. 11,763,627, which is a (Continued)

(51) Int. Cl.
*G07F 17/32* (2006.01)
*G07F 17/34* (2006.01)

(52) U.S. Cl.
CPC ...... *G07F 17/3223* (2013.01); *G07F 17/3209* (2013.01); *G07F 17/3211* (2013.01); (Continued)

(58) Field of Classification Search
CPC ............ G07F 17/3223; G07F 17/3209; G07F 17/3211; G07F 17/3227; G07F 17/3239; (Continued)

(56) References Cited

U.S. PATENT DOCUMENTS 8,147,334 B2 4/2012 Gatto et al.
8,764,566 B2 7/2014 Miltenberger et al.
(Continued)

OTHER PUBLICATIONS

Richtel "From the Back Office, a Casino Can Change the Slot Machine in Seconds," The NY Times, Apr. 12, 2006, 5 pages.
(Continued)

*Primary Examiner* — Kevin Y Kim
(74) *Attorney, Agent, or Firm* — Sheridan Ross P.C.

(57) ABSTRACT

The present disclosure relates generally to gaming machines, systems, and methods. As an example, a method is disclosed that includes enabling a user to interact with a game of chance via a user interface device of the electronic gaming machine, storing an amount of credit available for the player to play the game of chance in a credit meter, presenting the amount of credit available to the user via the user interface device, providing information from the credit meter to a wireless communication assembly, and transmitting, with the wireless communication assembly, the information from the credit meter to a game management system.

20 Claims, 9 Drawing Sheets

Related U.S. Application Data continuation of application No. 16/785,965, filed on Feb. 10, 2020, now Pat. No. 11,200,775.

(52) U.S. Cl.
CPC ...... *G07F 17/3227* (2013.01); *G07F 17/3239* (2013.01); *G07F 17/3241* (2013.01); *G07F 17/3244* (2013.01); *G07F 17/3293* (2013.01); *G07F 17/34* (2013.01)

(58) Field of Classification Search
CPC ............. G07F 17/3241; G07F 17/3244; G07F 17/3293; G07F 17/34
See application file for complete search history.

(56) References Cited

U.S. PATENT DOCUMENTS

| | | | | |
|---|---|---|---|---|
| 9,047,730 | B2 | 6/2015 | Barclay et al. | |
| 9,055,066 | B2 | 6/2015 | Kim et al. | |
| 10,369,461 | B2 | 8/2019 | Vukojevic et al. | |
| 11,200,775 | B2 | 12/2021 | Idris et al. | |
| 11,763,627 | B2 | 9/2023 | Idris et al. | |
| 2002/0049074 | A1 | 4/2002 | Eisinger et al. | |
| 2002/0151365 | A1 | 10/2002 | Walker et al. | |
| 2003/0157979 | A1 | 8/2003 | Cannon et al. | |
| 2003/0224854 | A1 | 12/2003 | Joao | |
| 2004/0132530 | A1 | 7/2004 | Rutanen et al. | |
| 2008/0020788 | A1 | 1/2008 | Griswold et al. | |
| 2011/0034252 | A1 | 2/2011 | Morrison et al. | |
| 2013/0210526 | A1 | 8/2013 | Kim | |
| 2013/0252695 | A1 | 9/2013 | Mackenzie | |
| 2014/0057705 | A1 * | 2/2014 | Elias | G07F 17/3244 463/25 |
| 2014/0206440 | A1 | 7/2014 | Liu | |
| 2014/0274408 | A1 | 9/2014 | Dave | |
| 2017/0249806 | A1 | 8/2017 | Lutnick et al. | |

OTHER PUBLICATIONS

Official Action for U.S. Appl. No. 16/785,965, dated Apr. 27, 2021 15 pages.
Notice of Allowance for U.S. Appl. No. 16/785,965, dated Aug. 12, 2021 8 pages.
Official Action for U.S. Appl. No. 17/548,936, dated Jan. 25, 2023 6 pages.
Notice of Allowance for U.S. Appl. No. 17/548,936, dated May 24, 2023 7 pages.

* cited by examiner

ELECTRONIC GAMING MACHINE WITH WIRELESS COMMUNICATION CAPABILITIES

CROSS REFERENCE TO RELATED APPLICATION

The present application is a continuation of and claims priority to U.S. application Ser. No. 17/548,936, filed Dec. 13, 2021, which is a continuation of and claims priority to U.S. application Ser. No. 16/785,965, filed Feb. 10, 2020, now Issued U.S. Pat. No. 11,200,775, the entire disclosures of which are hereby incorporated by reference.

BACKGROUND

The present disclosure is generally directed to gaming machines and gaming system and, in particular, toward cloud-based gaming systems.

Current gaming machines produce large amounts of information during gameplay. For instance, during a gaming session, a gaming machine may produce gameplay data in the form of wager information, cash-in information, cash-out information, win amounts, etc. Gameplay data and other information must first be collected before it can be analyzed. Gaming machines currently report gameplay data and other information via serial ports or Ethernet connections.

BRIEF SUMMARY

In certain embodiments, the present disclosure relates to an electronic gaming machine, a system, and a method. In some embodiments, an electronic gaming machine is provided, comprising: a user interface device; a processor coupled with the user interface device; and a computer-readable storage medium coupled with the processor and comprising: instructions that enable a user to interact with a game of chance via the user interface device; a credit meter that stores an amount of credit available for the user to play the game of chance; and instructions that present the amount of credit available to the user via the user interface device. The electronic gaming machine is further disclosed to comprise a wireless communication assembly, comprising: a data interface that receives, from the processor, information from the credit meter; memory that temporarily stores the information from the credit meter; and an antenna that wirelessly transmits the information from the credit meter to a distributed game management system.

In some embodiments, a system is provided, comprising: a first data interface; a processor coupled with the first data interface; and a computer-readable storage medium coupled with the processor and comprising instructions stored thereon that are executable by the processor, where the instructions comprise: instructions that enable a user to interact with a game of chance; instructions that collect and store gameplay information describing the user's interactions with the game of chance; and instructions that transmit the gameplay information describing the user's interactions with the game of chance via the first data interface. The system is further disclosed to comprise a wireless communication assembly, comprising: a second data interface that receives the information describing the user's interactions with the game of chance transmitted by the first data interface; memory that stores the gameplay information describing the user's interactions with the game of chance; and an antenna that wirelessly transmits the gameplay information describing the user's interactions with the game of chance to a distributed game management system.

In some embodiments, a method of operating an electronic gaming machine is provided, comprising: enabling a user to interact with a game of chance via a user interface device of the electronic gaming machine; storing an amount of credit available for the player to play the game of chance in a credit meter; presenting the amount of credit available to the user via the user interface device; providing, with a processor, information from the credit meter to a wireless communication assembly; and transmitting, with the wireless communication assembly, the information from the credit meter to a distributed game management system.

Additional features and advantages are described herein and will be apparent from the following Description and the figures.

DETAILED DESCRIPTION

Figure 1:
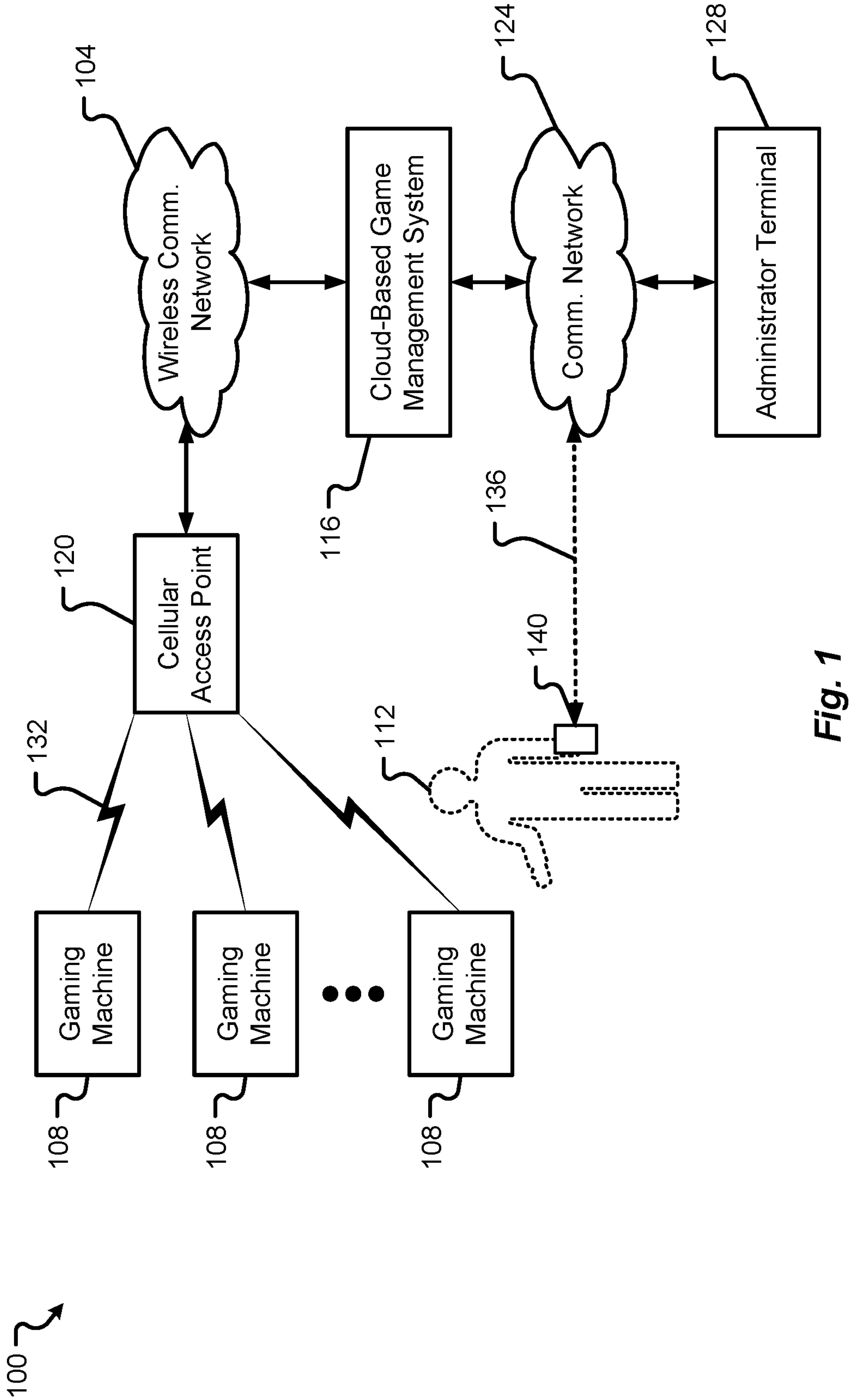
FIG. 1 is a block diagram of a system including a cloud-based game management system in accordance with embodiments of the present disclosure.

Embodiments of the present disclosure will be described in connection with an Electronic Gaming Machine (EGM) that is configured to interact with a cloud-based game management system, which may also be referred to as a distributed game management system. While particular embodiments will be described in connection with the game management system having a distributed architecture, it should be appreciated that certain behaviors or features of an EGM may be carried out with other architectures. For instance, aspects of the present disclosure contemplate that an EGM may execute various methods and features described herein in a mainframe or centralized game management system. Indeed, the various features described in connection with an EGM are not limited to use in a distributed game management system, but can be applied to any number of system architectures without departing from the scope of the present disclosure.

Moreover, the examples of the game management systems (whether centralized or distributed) depicted and described herein should not be construed as limiting. For instance, one example of the game management system may correspond to a casino game management system that is used to track player activity with respect to a particular game natively offered at the EGM (e.g., video poker, slots, keno, etc.). The casino game management system, in some embodiments, may correspond to a traditional slot Player Tracking System (PTS) that allows a player to play one or more casino games at the EGM. Another non-limiting example of the game management system may correspond to a sports wagering system. In this particular situation, a player may be allowed to play a traditional casino game at the EGM while also betting and tracking bets placed on sports events (or other wagerable events). Various game management systems may have their own player accounts, data formatting requirements, protocols, etc.

Embodiments of the present disclosure contemplate an EGM that includes an additional wireless communication assembly (e.g., a System Machine Interface Board or SMIB) that enables the EGM to wirelessly communicate with a game management system, such as a distributed game management system. In some embodiments, the wireless communication assembly may enable the EGM to communicate with the game management system via a cellular connection, although other wireless connections are also contemplated.

A wireless connection between the EGM and the game management system may provide a number of benefits. For instance, a wireless connection may simultaneously enhance and simplify the process of sharing gameplay data and other information from the EGM to the game management system. Moreover, particular wireless connections may facilitate this enhancement without having to access a proprietary third-party EGM network. Another possible benefit is that the EGM may be configured to have its game content updated or changed by the game management system in real-time based on control data uploaded to the EGM from the game management system over the wireless connection. Yet another possible benefit is that casino content or EGM configurations/settings may be changed in real-time based on control data uploaded to the EGM from the game management system over the wireless connection.

As a result, embodiments of the present disclosure may form the basis for a distributed or cloud-based game management system to control a number of EGMs at one or multiple locations. Moreover, the game management system may provide opportunities for modifications to the EGM by a number of different entities (e.g., EGM operators, EGM providers, EGM players, etc.). The game management system may also be configured to operate independently of the casino or lottery EGM network or third-party player tracking systems, thereby allowing the game management system with complete access to the full suite of gameplay data from the EGM.

It is one aspect of the present disclosure to provide an EGM with a wireless communication assembly that is connected to or incorporated within the EGM via a wired data and power connection. The wireless communication assembly may include one or more appropriately mounted antennas. The wireless communication assembly may be configured to receive or intercept a data stream from the main processor or controller of the EGM via a dedicated data interface (e.g., a serial or Ethernet connection). The wireless communication assembly may also include a processor that is configured to anonymize, encrypt, and compress the data and then transmit the anonymized/encrypted/compressed data to the game management system (e.g., a distributed game management system).

Once the data is received at the game management system, the data can be further processed and analyzed by the operator with appropriate applications (e.g., cloud-based applications) to provide enhanced operator functionality and download to any and all connected EGMs. In this manner, enhanced functionality can be added to any EGM independent of any host network or player tracking system. The wireless communication assembly may also enable the operator or user to call or text the EGM from their mobile phone and communicate with it via voice or text.

One aspect of the present disclosure is to provide an EGM with the ability to wirelessly connect to an online cloud-based game management system (and possibly other computing devices). The wireless connection may be facilitated by incorporating a wireless communication assembly into the EGM.

Another aspect of the present disclosure is to provide an EGM with a cellular data transmission device (which acts as "Man in the middle"—thus, not affecting existing systems).

Another aspect of the present disclosure is to provide the ability for bi-directional data transfers at various nodes of the system. For instance, a bi-directional data transfer is contemplated between the EGM and wireless communication assembly. As another example, a wireless bi-directional data transfer is contemplated between the wireless communication assembly and the cloud-based game management system. As another example, a bi-directional transfer is contemplated between the cloud-based game management system and other computing devices.

As noted above, providing an EGM with a wireless communication assembly provides many benefits including simplification of the data collection process. Specifically, the wireless EGM does not require operators to modify their network infrastructure (such as mounting new cables) when adding new machines or moving existing machines. It also becomes significantly easier to gather live machine data (such as system errors) from machines being played, without affecting the user playing the machine. Said another way, remote data diagnostics are provided without negatively impacting the user experience. Further still, a provider of the EGM may be allowed to receive machine data wirelessly and be able to make modifications (or at least give detailed instructions) remotely. This may occur in real-time if desired. Another benefit is that the EGM operator and/or EGM provider may be allowed (possibly simultaneously) to access player profile data, which may enable enhanced gameplay offerings or opportunities for the current user if real-time analysis is performed.

Another aspect of the present disclosure is that data collected by one or multiple EGMs can be analyzed in the cloud-based game management system by one or multiple entities. For instance, the EGM provider, the EGM operator, or other third parties may be allowed to collect all or less than all (e.g., filtered) data transmitted from the EGM to the cloud-based game management system. The types of data provided to a particular entity may be controlled by filters or permissions. As such, the cloud-based game management system may be private or public. In a private configuration, only certain entities may be allowed to access or subscribe to data being collected by the cloud-based game management system. In a public configuration, other entities (e.g., users or particular users) may be allowed to access their own gameplay data via a portal of the cloud-based game management system.

Another aspect of the present disclosure is to enable the EGM to report issues or errors via the wireless communication assembly. For instance, the EGM may be configured to automatically call, text, email, etc. one or multiple predefined addresses or numbers of an event or series of events occurs at the EGM. Continuing this example, if the EGM detects an error on the floor, a game malfunction, an exceeded Return to Player (RTP), or the like, then the EGM may be configured to automatically call, text, or email a particular phone number, email address, IP address, etc. in response to detecting the event.

Another aspect of the present disclosure is to enable the EGM to have its game content changed in real-time. Specifically, with a wireless communication assembly and by provided a cloud-based game management system, the EGM may be configured to update its game content without requiring in-person physical modifications to the game code of the EGM. Instead, the cloud-based game management system may remotely initiate a download/release of new game sounds, graphics, animations, etc. via the wireless connection. This may also enable the EGM operator or EGM provider to change game content based on player profiles.

Continuing the above example, an EGM operator may be allowed to dial-up or otherwise establish a bi-directional data exchange between an administrator terminal and the EGM. This bi-directional data exchange may enable the operator to communicate directly with the user (e.g., via an interaction window). Alternatively or additionally, the bi-directional data exchange may enable the EGM operator to change game content, change machine settings, etc. without physically touching the EGM.

Another aspect of the present disclosure is to enable data streaming to the EGM via the wireless communication assembly. The content provided to the EGM via the data stream may include advertisement content, event description content, tournament content, promotional offer content, casino-internal lottery drawing opportunities, etc.

Another aspect of the present disclosure is to enable user-to-EGM communications. For instance, if the user knows a mobile number associated with an EGM (e.g., the mobile number stored by the EGM's wireless communication assembly), then the user could be allowed to call or text the EGM to obtain status information from the EGM (e.g., a description of whether the EGM is currently available or in use by another person). If the EGM is enabled with some sort of automated response technology (e.g., a chat bot or the like), then the user could be allowed to wirelessly or remotely interact with the EGM and carry a discussion with the EGM. Likewise, the user may provide a request to the EGM to notify the user when the EGM next becomes available. Once the EGM detects that a current gaming session has ended with another person, the EGM may automatically call or text the requesting/subscribing user's mobile phone and notify the user that the EGM has become available. Other types of machine state information could be provided to a user on a subscription basis and the EGM may be provided with functionality to manage multiple subscriptions or requests issued by multiple different users.

Another aspect of the present disclosure is to enable player profile information to be gathered and shared in an effort to enhance the user experience with the EGM. For instance, the cloud-based game management system may be configured to gather data and create player profiles. Such player profiles may be created based on gaming behavior received and analyzed in real-time and/or based on gaming behavior received and analyzed after being stored in a database. Such player profile information may include general descriptions of player behaviors rather than a profile for a particular user. For instance, the cloud-based game management system may be configured to develop profiles describing which player type is playing a particular EGM or EGM type at a particular day or time of day. The cloud-based game management system may also facilitate personalized game content changes (e.g., sounds, graphics, rules, etc.) based on personal preferences when a user has a player rewards account with the game management system.

Another aspect of the present disclosure is to enable users to access their gameplay data via the cloud-based game management system. In particular, a user portal may be provided that enables the user to access, via login information, their gameplay history (e.g., individual game performance, overall gameplay statistics, games played, RTP, casino visit history, average number of games played per visit, comparisons of gameplay data between in-person visits and remote/mobile gameplay, etc.). The cloud-based game management system may also be configured to automatically report responsible gaming data to the user or provide notifications that certain responsible gaming thresholds have been exceeded.

These and other aspects will now be described in further details with reference to FIGS. 1-9.

Gaming System

With reference initially to FIG. 1, details of an illustrative gaming system 100 will be described in accordance with at least some embodiments of the present disclosure. The components of the system 100, while depicted as having particular instructions and devices, are not necessarily limited to the examples depicted herein. Rather, a system according to embodiments of the present disclosure may include one, some, or all of the components depicted in the system 100 and does not necessarily have to include all of the components in a single device.

The gaming system 100 is shown to include one or more wireless communication networks 104 that interconnect and facilitate machine-to-machine communications between one or multiple gaming machines 108 and a cloud-based game management system 116. It should be appreciated that a wireless communication network 104 may correspond to one or many communication networks or cellular networks without departing from the scope of the present disclosure. In some embodiments, the gaming machines 108 and game management system 116 may be configured to communicate using various nodes or components of a wireless communication network 104. For instance, the wireless communication network 104 may include a cellular access point 120 that connects gaming machines 108 to the wireless communication network 104.

The cloud-based game management system 116 may also be in communication with one or more administrator terminals 128 and/or a user's 112 mobile device 140 via another communication network 124. The communication network 124 may be similar to or different from the wireless communication network 124. For instance, the communication network 124 may comprise any type of known communication medium or collection of communication media and may use any type of protocols to transport messages between endpoints. The communication network 124 may include wired and/or wireless communication technologies. The Internet is an example of the communication network 124 that constitutes an Internet Protocol (IP) network consisting of many computers, computing networks, and other communication devices located all over the world, which are connected through many telephone systems and other means. Other examples of the communication network 124 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 124 need not be limited to any one network type, and instead may be comprised of a number of different networks and/or network types. Moreover, the communication network 124 may comprise a number of different communication media such as coaxial cable, copper cable/wire, fiber-optic cable, antennas for transmitting/receiving wireless messages, and combinations thereof.

The mobile device 140 may be connected to the communication network 124 via a wireless connection 136, which may correspond to a cellular connection. Alternatively or additionally, the connection 136 may correspond to a wired connection without departing from the scope of the present disclosure. As will be described in further detail herein, the connection 136 may enable the user 112 to access player profile information at the cloud-based game management system 116 and/or subscribe to then receive system updates from a gaming machine 108.

In some embodiments, the gaming machines 108 may be distributed throughout a single property or premises (e.g., a single casino floor) or the gaming machines 108 may be distributed among a plurality of different properties. Some or all of the gaming machines 108 may be connected with the cellular access point 120 (or different cellular access points 120) via a wireless connection 132. The nature of the wireless connection 132 may depend upon the communication protocol used by the wireless communication network 104 and/or cellular access points 120. The wireless connection 132 may enable a gaming machine to quickly and easily connect with the cloud-based game management system 116. The wireless connection 132 may also simplify moving a gaming machine 108 from one physical location to another physical location relatively easy as machine re-wiring is not required. While only a single cellular access point 120 is depicted, it should be appreciated that the wireless communication network 104 may include a plurality of cellular access points 120. It should also be appreciated that a cellular access point 120 may include any type of network device. As some non-limiting examples, the cellular access point 120 may include a cellular base station, a Wi-Fi access point, a modem, a wireless router, or the like. The wireless communication network 104 may utilize any type of multiplexing scheme to manage the various communications from multiple gaming machines 108. Examples of such multiplexing schemes include, without limitation, Frequency Division Multiple Access (FDMA), Time Division Multiple Access (TDMA), Code Division Multiple Access (CMDA), and/or Space Division Multiple Access (SDMA). The cellular access point 120 may have a communication range from between 10 m to 10 km without departing from the scope of the present disclosure.

The gaming machines 108 may utilize the same or different types of communication protocols to connect with the communication network 104. It should also be appreciated that the gaming machines 108 may or may not present the same type of game or wagering interface to a user 112. For instance, a first gaming machine 108 may correspond to a gaming machine that presents a slot game to the user 112, the second gaming machine 108 may correspond to a sports betting terminal, and other gaming machines 108 may present lottery games or other types of games or a plurality of different games for selection and eventual play by a user 112. It may be possible for the some of the gaming machines 108 to communicate with one another via a communication network 104.

A gaming machine 108 may correspond to a type of device that enables user 112 interaction in connection with making wagers, communicating, watching live competitive contests, and/or playing games of chance. For instance, the gaming machines 108 may correspond to a type of device that enables a first user 112 to interact with a second user 112 at respective gaming machines 108. In other embodiments, each user 112 may be enabled to play a game individually at a gaming machine 108.

As will be discussed in further detail herein, a user 112 may be allowed to carry a mobile device 140 and the mobile device 140 may also be used to interact with the cloud-based game management system 116. A mobile device 140 may be utilized by the user 112 to create a player account, manage player profile information at the cloud-based game management system 116, and/or connect with a gaming machine 108.

In some embodiments, a user 112 may login to the cloud-based game management system 116 by presenting the mobile device 140 to a gaming machine 108, which causes components of the gaming machine 108 to initiate a login process with the cloud-based game management system 116 on behalf of the user 112.

As mentioned above, the cloud-based game management system 116 may correspond to a system used by a casino operator to manage slot games, video poker games, bingo games, keno games, or the like that are played on one or more of the gaming machines 108. In some embodiments, the cloud-based game management system 116 may correspond to a system used by the casino operator to manage sports wagers placed by users 112 either at a sports desk or at a gaming machine 108. As another example, the cloud-based game management system 116 may be used by to manage and execute a lottery game or multiple lottery games.

Gaming Machine

Figure 2:
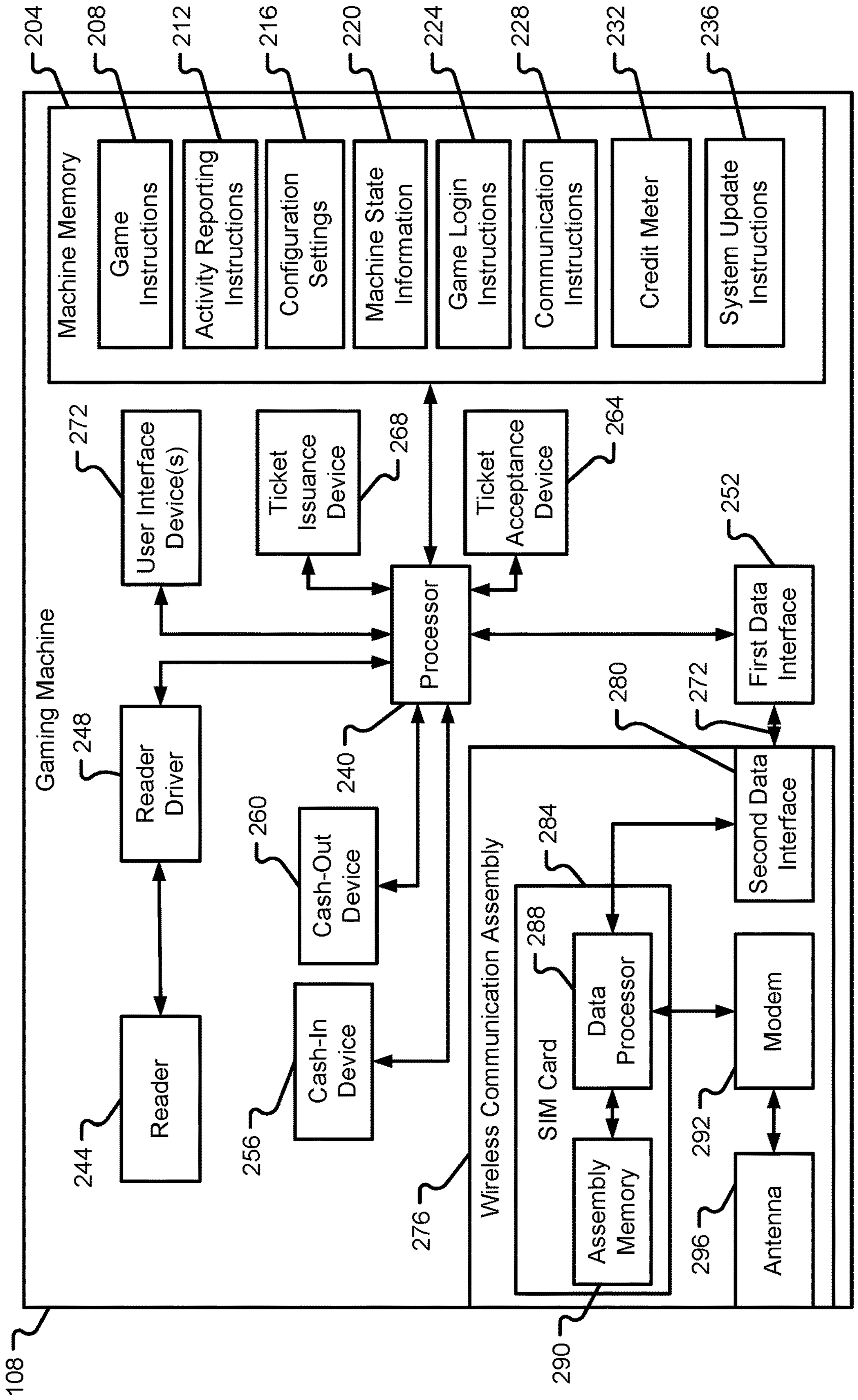
FIG. 2 is a block diagram depicting details of a gaming machine in accordance with embodiments of the present disclosure.

With reference now to FIG. 2, additional details of a gaming machine 108 will be described in accordance with at least some embodiments of the present disclosure. While depicted as a gaming machine 108, it should be appreciated that some or all of the components of a single gaming machine 108 may be distributed across multiple gaming machines 108 (of the same or different type) without departing from the scope of the present disclosure. It should also be appreciated that one or more features of a gaming machine 108 may be provided in a user's 112 mobile device 140 without departing from the scope of the present disclosure.

The gaming machine 108 is shown to include machine memory 204, a processor 240, a reader 244, a reader driver 248, a first data interface 252, a cash-in device 256, a cash-out device 260, a ticket acceptance device 264, a ticket issuance device 268, one or more user interface devices 272, and a wireless communication assembly 276.

The processor 240 may include one or multiple computer processing devices. In some embodiments, the processor 240 may include a microprocessor, a CPU, a microcontroller, or the like. The processor 240 may also be configured to execute one or more instructions stored in machine memory 204.

The machine memory 204 may include one or multiple computer memory devices that are volatile or non-volatile. The machine memory 204 may be configured to store instructions that enable user 112 interaction with the gaming machine 108, that enable the gaming machine 108 to interact with a game of chance, that enable the gaming machine 108 to interact with a cloud-based game management system 116, that enable the user 112 to interact with the cloud-based game management system 116, that enable wireless communications with a cloud-based game management system 116, and the like. The machine memory 204 may be provided as a computer-readable medium that stores the instructions and various other data structures or code elements. Examples of instructions that may be stored in the machine memory 204 include game instructions 208, activity reporting instructions 212, game login instructions 224, communication instructions 228, and system update instructions 232. The machine memory 204 is also shown to store various types of data or data sets describing the gaming machine 108, details of a gaming session being conducted by a user 112 at the gaming machine 108, and/or details of a user 112 of the gaming machine 108. As some non-limiting examples, the machine memory 204 may be used to store configuration settings 216, machine state information 220, and a credit meter 232.

The game instructions 208, when executed by the processor 240, may enable the gaming machine 108 to facilitate one or more games of chance or skill and produce interactions between the user 112 and the game of chance or skill. In some embodiments, the game instructions 208 may include subroutines that present one or more graphics to the user 112 via a user interface in accordance with configuration settings 2216, subroutines that calculate whether a particular game wager has resulted in a win or loss during the game of chance or skill, subroutines for determining payouts for the user 112 in the event of a win, subroutines for determining whether a user 112 has enough available credits in the credit meter 232 to allow a particular bet or set of bets, and any other subroutine or set of instructions that facilitate gameplay at or in association with the gaming machine 108. In some embodiments, activities, outputs, or inputs of the game instructions may be stored or recorded at the machine state information 220. For instance, the machine state information 220 may store information describing whether a user 112 is currently interacting with the game instructions 208 (e.g., conducting a gaming session), an amount of time that a user 112 has been interacting with the game instructions 208, whether the gaming machine 108 is currently sitting idle, betting levels of a user 112, and the like.

The activity reporting instructions 212, when executed by the processor 240, may enable the gaming machine 108 to determine when particular activities or events registered at the gaming machine 108 should be reported to the cloud-based game management system 116, to a subscribing user 112, or both. In some embodiments, the activity reporting instructions 212 may be configured to determine that machine state information 220, information from the credit meter 232, or other information describing gameplay at the gaming machine 108 should be shared with the first data interface 252 for transfer to the wireless communication assembly 276. When the processor 240 executes the activity reporting instructions 212 and provides information to the wireless communication assembly 276 via the first data interface 252, the wireless communication assembly 276 may perform its own set of processes prior to transmitting the information to the cloud-based game management system 116 via the wireless communication network 104.

More specifically, the processor 204 may provide information to the wireless communication assembly 276 via the first data interface 252. The data may be packetized or encoded such that it can be transmitted across a communication medium 272 to a second data interface 280 of the wireless communication assembly 276. In some embodiments, the wireless communication assembly 276 may be configured as a SMIB and the second data interface 280 may be similar to the first data interface 252, although the two data interfaces do not need to be identical. For instance, the first data interface 252 and second data interface 280 may both correspond to a serial data port and the communication medium 272 may correspond to a serial data cable, USB cable, or the like. Alternatively or additionally, the first data interface 252 and second data interface 280 may correspond to Ethernet ports and the communication medium 272 may correspond to an Ethernet or CAT5 or CAT6 cable. Data may be bi-directionally transferred across the communication medium 272 at any communication speed, which may depend upon the capabilities of the first data interface 252 and/or second data interface 280. For instance, the first data interface 252 and second data interface 280 may be configured to exchange data with one another at speeds anywhere between 10 Mbps to 100 Gbps, or even higher.

The wireless communication assembly 276 is further shown to include a data processor 288, assembly memory 290, a modem 292, and an antenna 296. The data processor 288 and assembly memory 290 are illustratively shown to be provided in a single form factor, such as a Subscriber Identity Module (SIM) card 284, which may be in the form of a traditional SIM card or an embedded SIM (eSIM) card. The assembly memory 290 may be similar to machine memory 204, but does not necessarily need to be similar. In some embodiments, the assembly memory 290 may include one or more temporary memory devices (e.g., buffer memory), one or more secure memory devices (e.g., encrypted memory for storing an encryption key and/or mobile number), and one or more computer memory devices used to store instructions or machine code that are executable by the data processor 288. Alternatively or additionally, the data processor 288 may correspond to an IC chip that executes predefined tasks without necessarily executing instructions stored in the assembly memory 290.

Although the data processor 288 is shown as being connected directly to the second data interface 280 it should also be appreciated that a modem (same or different from model 292) may be provided between eh second data interface 280 and the data processor 288. The data processor 288 may be configured to receive data from the second data interface 280 (e.g., information transmitted by the processor 240) and temporarily store at least some of the received data into the assembly memory 290. The data processor 288 may also be configured to encode, encrypt, and/or compress the data for transmission by the antenna 296. In some embodiments, the data processor 288 may be responsible for encrypting and/or compressing data whereas the modem 292 may be responsible for encoding the data for transmission by the antenna 296. Alternatively or additionally, the data processor 288 may be provided with functionality of the modem 292, or vice versa. In some embodiments, the modem 292 (or data processor 288) may be configured to exchange data with the cellular access point 120 according to a predefined communication protocol and data stored in assembly memory 290 may be formatted according to the communication protocol prior to being committed to the antenna 296 for wireless transmission across the wireless connection 132. The data transmitted with the antenna 296 may be encoded based on the predefined communication protocol and may be encrypted with one or more encryption keys stored in the assembly memory 290.

As will be discussed in further detail herein, the gaming machine 108, through coordinated use of the processor 240 and wireless communication assembly 276 may be configured to report any type of information to the cloud-based game management system 116 via the cellular access point 120. Such information may include, but is not limited to, the machine state information 220, information from the credit meter 232, and other information as desired. While the activity reporting instructions 212 may generally be responsible for controlling when the processor 240 reports such data to the cloud-based game management system 116, the system update instructions 236 may also be configured to control when certain types of information are reported via the wireless communication assembly 276. In particular, the system update instructions 236, when executed by the processor 240, may enable the gaming machine 108 to accept subscription requests from users 112 that include a mobile number associated with the user 112 (or a mobile device 140 of the user 112). When the machine state information 220 changes to or from a particular state (e.g., from "in use" to "available"), the system update instructions 236 may be configured to report the change in state information to any number of subscribing users 112. The report of state information may be provided by a call, text, or email initiated with the wireless communication assembly 276 and transmitted via the wireless communication network 104. Although not depicted, the user's 112 mobile device 140 may be connected directly to the wireless communication network 104, meaning that reports transmitted by the wireless communication assembly 276 of a particular gaming machine 108 do not necessarily need to travel through the cloud-based game management system 116 on their way to the user's 112 mobile device 140.

The wireless communication assembly 276 may also enable a remotely located administrator to update the game instructions 208, configuration settings 216, or other aspects of the gaming machine 108 remotely. In particular, a system administrator may be allowed to access the cloud-based game management system 116 via the administrator terminal 128 and initiate updates to one or many gaming machines 108. Alternatively or additionally, the cloud-based game management system 116 may be configured to automatically initiate updates of a gaming machine 108 in response to detecting certain conditions (e.g., a particular user 112 is logged in and playing a particular gaming machine 108, a particular gaming machine 108 is out of date, etc.). Updates initiated by the cloud-based game management system 116 may be similar to or different from the updates initiated by an administrator using the administrator terminal 128. Such updates may include updates to updates to the game instructions 208, updates to configuration settings 212, etc.

The communication instructions 228, when executed by the processor 240, may enable the gaming machine 108 to facilitate communications between a user 112 of the gaming machine 108 and an administrator positioned at the administrator terminal 128. In particular, the communication instructions 228 may launch an interaction window via a user interface device 272 of the gaming machine 108 that enables the user 112 to communicate, in real-time, with the remotely located administrator. The communications (e.g., voice, video, text, etc.) flowing between the gaming machine 108 and administrator terminal 128 may pass through the wireless communication assembly 276.

The game login instructions 224, when executed by the processor 240 and/or reader driver 248, may enable the gaming machine 108 to initiate a login process for a user 112 with the cloud-based game management system 116. In some embodiments, the login process for the cloud-based game management system 116 may be initiated automatically in response to a card read event occurring at the reader 244. In some embodiments, the login process for the first game management system 116 may be initiated in response to registering a first credential read event at the reader 244. Alternatively or additionally, the login process for the cloud-based game management system 116 may be initiated in response to reading data from the mobile device 140 and confirming a validity of the data read from the mobile device 140.

The credit meter 232 may correspond to a device or collection of devices that facilitates a tracking of wager activity or available wager credits at the gaming machine 108. Such credits may be made available for wagers or bets placed on a game managed by the cloud-based game management system 116. In some embodiments, the credit meter 232 may be used to store or log information related to various user 112 activities and events that occur at the gaming machine 108. The types of information that may be maintained in the credit meter 232 include, without limitation, player information, available credit information, RTP information, wager amount information, and other types of information that may or may not need to be recorded for purposes of accounting for wagers placed at the gaming machine 108 and payouts made for a user 112 during a game of chance or skill played at the gaming machine 108. In some embodiments, the credit meter 232 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming machine 108, and the like. Some or all of the data within the credit meter 232 may be reported to the cloud-based game management system 116 via coordinated efforts of the processor 240 and wireless communication assembly 276. As an example, the number, value, and timing of wagers placed by a particular user 112 and payouts on such wagers may be reported at intervals determined appropriate by the activity reporting instructions 212.

The cash-in device 256 may include a bill acceptor, a coin acceptor, a chip acceptor or reader, or the like. In some embodiments, the cash-in device 256 may also include credit card reader hardware and/or software. The cash-out device 260 may operate and issue cash, coins, tokens, or chips based on an amount indicated within the credit meter 232. In some embodiments, the cash-out device 260 may include a coin tray or the like and counting hardware configured to count and distribute an appropriate amount of coins or tokens based on a user's 112 winnings or available credit within the credit meter 232.

The gaming machine 108 may also be provided with a ticket acceptance device 264 that is configured to accept or scan physically printed tickets/vouchers and extract appropriate information therefrom. In some embodiments, the ticket acceptance device 264 may include one or more machine vision devices (e.g., a camera, IR scanner, optical scanner, barcode scanner, etc.), a physical ticket acceptor, a shredder, etc. The ticket acceptance device 264 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a user's 112 mobile communication device 140, for example.

The ticket issuance device 268 may be configured to print or provide physical tickets/vouchers to users 112. In some embodiments, the ticket issuance device 268 may be configured to issue a ticket/voucher consistent with an amount of credit available to a user 112, possibly as indicated within the credit meter 232.

The user interface device(s) 272 may correspond to any type of mechanical or software-based input and/or output device. In some embodiments, the user interface device(s) 272 may be provided on a common panel or portion of the gaming machine 108 and may be used to initiate a predetermined function in response to being pressed by the user 112. In addition to the examples of user interface devices 272 described above, it should be appreciated that a user interface device 272 may alternatively or additionally take the form of one or more depressible buttons, a lever or "one armed bandit handle," etc.

The reader 244 may be configured to read credentials of different types. For instance, the reader 244 may be configured to read the mobile device 140 or other credentials that operate with a defined protocol or utilize an expected data format. The format or form factor of a credential carried by the user 112 should not be limited to any particular type of format or form factor. Examples of suitable form factors that may be as a credential include, without limitation, magstripe cards, chip-based cards, contactless/wireless cards, key fobs, mobile devices 140, optically-readable cards, or the like. It should be appreciated that a user's 112 credential may be capable of being read by a reader 244 when brought within a predetermined distance of the reader 244 (e.g., if the reader 244 includes an antenna and is utilize a contactless communication protocol like Near Field Communications (NFC) or Bluetooth). Alternatively or additionally, a credential may be capable of being read by a reader 244 when inserted to a slot of a card reader 244 or swiped through a card reader 244. To the extent that the form factor of a credential can vary and is not limited, it should be appreciated that the reader 244 may be provided with any number of hardware and/or software components to enable interactions with a credential. More specifically, each a reader 244 may include one or multiple readers, each of which may be provided with appropriate hardware and/or software components to enable the reader 244 to extract/read data that is stored on a credential and/or mobile device 140.

Game Management System

Figure 3:
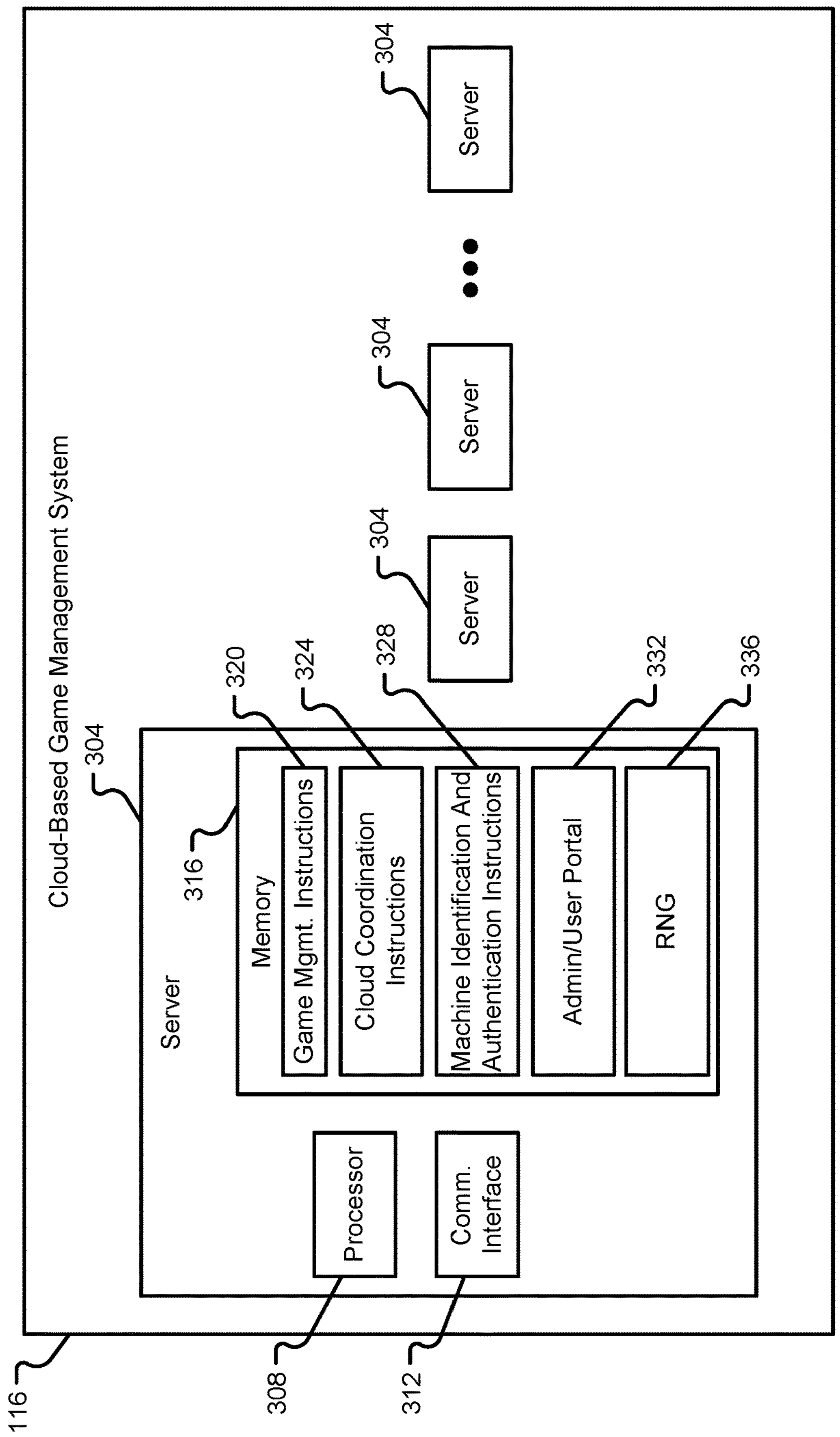
FIG. 3 is a block diagram depicting details of a cloud-based game management system in accordance with embodiments of the present disclosure.

With reference now to FIG. 3, additional details of a cloud-based game management system 116 will be described in accordance with at least some embodiments of the present disclosure. The cloud-based game management system 116 is shown to include a distributed computing architecture (e.g., a plurality of servers 304). Some or all of the servers 304 in the cloud-based game management system 116 may be configured with similar components, instructions, code sets, or the like, which means that the cloud-based game management system 116 may correspond to a distributed and highly-available system in which one or more servers 304 act to backup other servers 304. Alternatively or additionally, the servers 304 of the cloud-based game management system 116 may be configured for parallel data processing capabilities. In some embodiments, the servers 304 of the cloud-based game management system 116 are presented to the outside world (e.g., components outside the system 116) as a single entity or node. The cloud-based game management system 116 may appear to gaming machines 108, administrator terminals 128, and/or mobile devices 140 as single computing nodes or servers. Although not depicted, one or more of the servers 304 may be configured to execute a virtual machine or multiple virtual machines in connection with providing the cloud-based game management system 116.

Although details of a single server 304 are shown in FIG. 3, it should be appreciated that the other servers 304 may be provided with similar or identical components. Alternatively, some components depicted in FIG. 3 may be provided in one server whereas other components may be provided in another server. For illustrative purposes, one or more of the servers 304 may include a processor 308, a communication interface 312, and memory 316.

The processor 308 may be similar or identical to processor 204 and/or data processor 288. In some embodiments, the processor 308 may include one or multiple computer processing devices. In some embodiments, the processor 308 may include a microprocessor, a CPU, a microcontroller, or the like. The processor 304 may also be configured to execute one or more instructions stored in memory 316.

The communication interface 312 may enable the server 304 to connect with the wireless communication network 104 and/or communication network 124. The communication interface 312 may include one or more communication ports, switches, routes, etc. that connect with a cable or the like. Alternatively or additionally, the communication interface 312 may include an antenna and/or a driver for the antenna that enables the server 304 to wirelessly communicate with other machines.

The memory 316 may be similar or identical to other memory devices depicted and described herein. For instance, the memory 316 may be similar or identical to machine memory 204 and/or assembly memory 290. The memory 316 may include one or more volatile or non-volatile memory devices that are configured to store instructions for execution by the processor 308. Alternatively or additionally, the memory 316 may be configured to store other data to be used in connection with providing game management functions for the gaming machines 108. The illustrative types of instructions that may be stored in memory 316 include, without limitation, game management instructions 320, cloud coordination instructions 324, machine identification and authentication instructions 328, and an administrator/user portal 332. The memory 316 is also shown to include instructions for executing an RNG 336, though it should be appreciated that functionality of an RNG 336 may be provided by the processor 308 without executing instructions from memory. Rather, the RNG 336 may correspond to a particular routine that is natively built into the processor 308 and/or that relies on a clock of the processor 308 for generating a random or pseudo random output when called.

The game management instructions 320, when executed by the processor 308, may enable the server 304 to provide game management features and functions for some or all of the gaming machines 108. In some embodiments, the game management instructions 320 may be configured to interact with game instructions 208 and receive information transmitted by the wireless communication assembly 276. More specifically, the game management instructions 320 may include subroutines that mirror subroutines in the game instructions 208. As another example, the game management instructions 320 may be configured to receive information reported by the gaming machine (e.g., outputs of the credit meter 232, outputs of the game instructions 208, activity updates, machine state information 220, etc.) and then produce further outputs for transmission back to the gaming machine 108. The further outputs provided back to the gaming machine 108 may be used as further inputs for the game instructions 208 to continue executing a game of chance for a user 112. In some embodiments, the game management instructions 320 may be responsible for enabling user login activities, registering player profile information, and the like. In some embodiments, the game management instructions 320 may be configured to act as a proxy for some portions of code that would otherwise be provided in the game instructions 208. In such a configuration, the game management instructions 320 may provide a cloud-based or virtualized version of the game instructions 208 that are normally provided on a gaming machine 108 itself.

The cloud coordination instructions 324, when executed by the processor 308, may enable the server 304 to coordinate with other servers 304 in the cloud-based game management system 116. The cloud coordination instructions 324, when executed, may enable a particular server 304 to determine what types of processing activities it is responsible for within the cloud-based game management system 116 and what types of processing activities are being performed by other servers 304 in the cloud-based game management system 116. In some embodiments, the cloud coordination instructions 324 may utilize any type of coordination protocol that is known to be used within a cloud-computing architecture (e.g., a Web Services (WS)-Coordination Protocol, a negotiation protocol, a race protocol, a control loop protocol, etc.).

The machine identification and authentication instructions 328, when executed by the processor 308, may enable the server 304 to communicate with gaming machines 108 over the wireless communication network 104 in a trusted and secure manner. In some embodiments, the machine identification and authentication instructions 328 may be configured to execute an authentication and identification protocol with a gaming machine 108 by exchanging authentication challenge/response communications with the gaming machine 108 over the wireless communication network 104. In some embodiments, the gaming machine 108 may provide the server 304 with a mobile number, one or more encryption keys (e.g., symmetrical encryption keys or asymmetrical encryption keys), and other information to enable the server 304 to uniquely identify that gaming machine 108 from among other gaming machines 108 and to determine that the gaming machine 108 is a true and authentic (e.g., non-tampered and non-counterfeit) gaming machine 108. The machine identification and authentication instructions 328 may utilize any type of known or yet to be developed identification and authentication protocol. As a non-limiting example, the machine identification and authentication instructions 328 may utilize any type of authentication method known or yet to be developed for use in cellular networks (e.g., 4G EPS-AKA, 5G-AKA, EAP-AKA', and EAP-TLS).

The admin/user portal 332, when executed by the processor 308, may enable the server 304 to present a web portal or various HTML pages to a gaming machine 108, administrator terminal 128, and/or mobile device 140 that enables administration personnel and/or the user 112 to access certain types of information received and collected at the cloud-based game management system 116. In some embodiments, a user 112 may be presented with player profile information, gameplay history, and the like for either their particular profile or for players having a similarity to their playing habits. In some embodiments, a system administrator may be provided with a web-based interface that enables the system administrator to initiate updates of gaming machines 108, initiate updates of particular games, initiate updates of configuration settings 216 of one or multiple gaming machines 108, initiate updates of game instructions 208, update a particular output of a game instruction 208 for a particular user 112 during a gaming session conducted by the user 112, and/or to perform any other operation on a gaming machine 108 or multiple gaming machines 108 that are normally otherwise performed in person by a technician. In this way, the cloud-based game management system 116 may enable a system administrator of a gaming machine 108 operator or a gaming machine 108 provider to update, debug, and/or trouble shoot one or multiple gaming machines 108.

Methods

With reference now to FIGS. 4-9, various methods will be described in accordance with at least some embodiments of the present disclosure. It should be appreciated that the disclosed methods may be performed by one, some, or all of the devices depicted and described herein. Said another way, any device within the system 100 may be used to perform some or all of a method depicted and described herein. Moreover, although certain steps are depicted as being performed in a certain order or in connection with a particular method, it should be appreciated that any method step depicted and described herein may be performed in combination with any other method step depicted and described herein.

Figure 4:
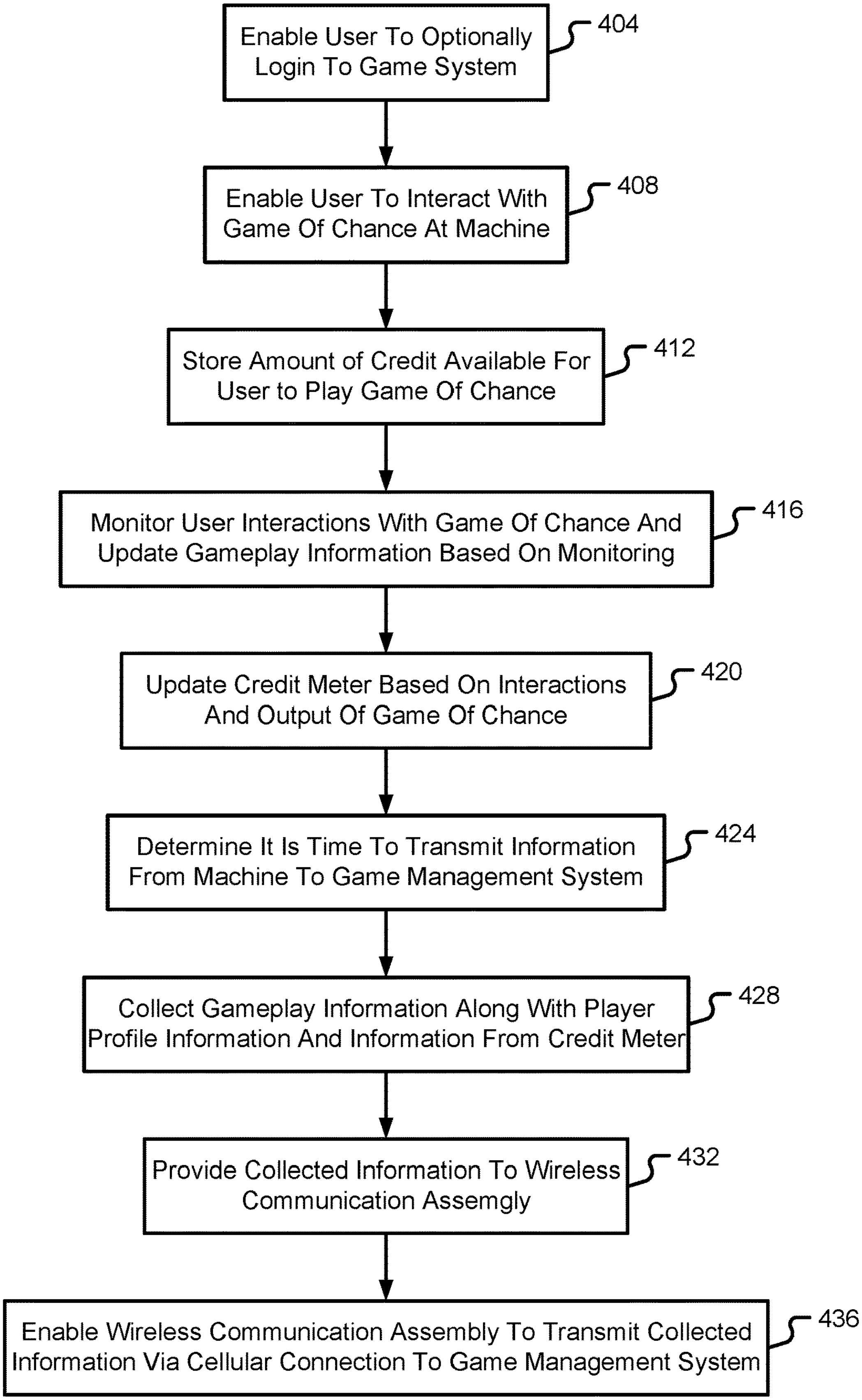
FIG. 4 is a flow diagram depicting a method of operating a gaming machine and wirelessly reporting information from the gaming machine in accordance with embodiments of the present disclosure.

Referring initially to FIG. 4, a method of operating a cloud-based game management system 116 will be described in accordance with embodiments of the present disclosure. The method begins by enabling a user 112 to login to the cloud-based game management system 116 (step 404). The login process may be facilitated by execution of the game login instructions 224 and may involve transmitting at least some information between the gaming machine 108 and the cloud-based game management system 116 via the wireless communication network 104. It should be appreciated that the login process may not necessarily be required and, therefore, may be considered an optional part of the method.

The method continues by enabling the user 112 to interact with a game of chance (or other game offered by the gaming machine 108) (step 408). The game interactions may be controlled at least in part by the game instructions 208, but may also involve execution of the game management instructions 320 at the cloud-based game management system 116. Although embodiments of the present disclosure are described in connection with enabling a user 112 to interact with a game of chance, it should be appreciated that any type of game may be offered to the user 112 by the gaming machine 108 by execution of the gaming instructions 208 and/or by execution of the game management instructions 320.

The method continues as the user 112 interacts with the game. Part of the interactions during gameplay (e.g., during a gaming session of the user 112) may involve tracking available credits for the user 112. Such available credits, additions to credits, deductions from credits, purchasing of additional credits, etc. may be stored in the credit meter 232 of the gaming machine 108 (step 412).

The method may also include monitoring the user's 112 interactions with the game and updating the user's 112 gameplay information based on the actions or events detected during the monitoring (step 416). For instance, this step may involve monitoring wagers placed by the user 112, monitoring particular games played by the user 112, monitoring win events, monitoring jackpot events, monitoring coin-in events, monitoring coin-out events, monitoring ticket-in events, monitoring ticket-out events, monitoring a rate of play, monitoring RTP for the user 112, monitoring historical gameplay statistics (e.g., with reference to previous gameplay statistics), etc.

As gameplay continues, the method may further involve updating the credit meter 232 when user 112 interactions dictate such updates and/or when outputs of the game instructions 208 dictate such outputs (step 420). Possibly based on updates to the credit meter 232 (or based on particular types of updates or changes to the credit meter 232 exceeding a particular threshold value), the activity reporting instructions 212 may determine that information should be reported from the gaming machine 108 to the cloud-based game management system 116 (step 424). This determination may be made in response to a particular event occurring or being detected at the gaming machine 108, in response to a collection or series or events occurring or being detected at the gaming machine 108, in response to a predetermined amount of time passing since information was last reported, etc.

Following the determination of step 424, the activity reporting instructions 212 may collect the appropriate gameplay information along with information describing the user's 112 gameplay habits (e.g., for adding to the player profile information of the user 112) and information from the credit meter 232 (step 428). The information collected from the credit meter 232 may include current available credit, total credits awarded, total credits played, or any other credit information that can be tracked and reported by the credit meter 232.

The method further continues with the processor 204 providing the collected information to the wireless communication assembly 276 via the first data interface 252, the communication medium 272, and the second data interface 280 (step 432). The wireless communication assembly 276 may then utilize its data processor 288 and/or modem 292 to prepare the information received from the processor 204 for transmission by the antenna 296. In particular, the data received at the second data interface 280 may be anonymized, encrypted, compressed, and/or encoded for transmission by the antenna 296 to the cellular access point 120 (step 436). Transmission of the information by the antenna 296 may cause the information to travel to the cloud-based game management system 116 via the wireless communication network 104.

Figure 5:
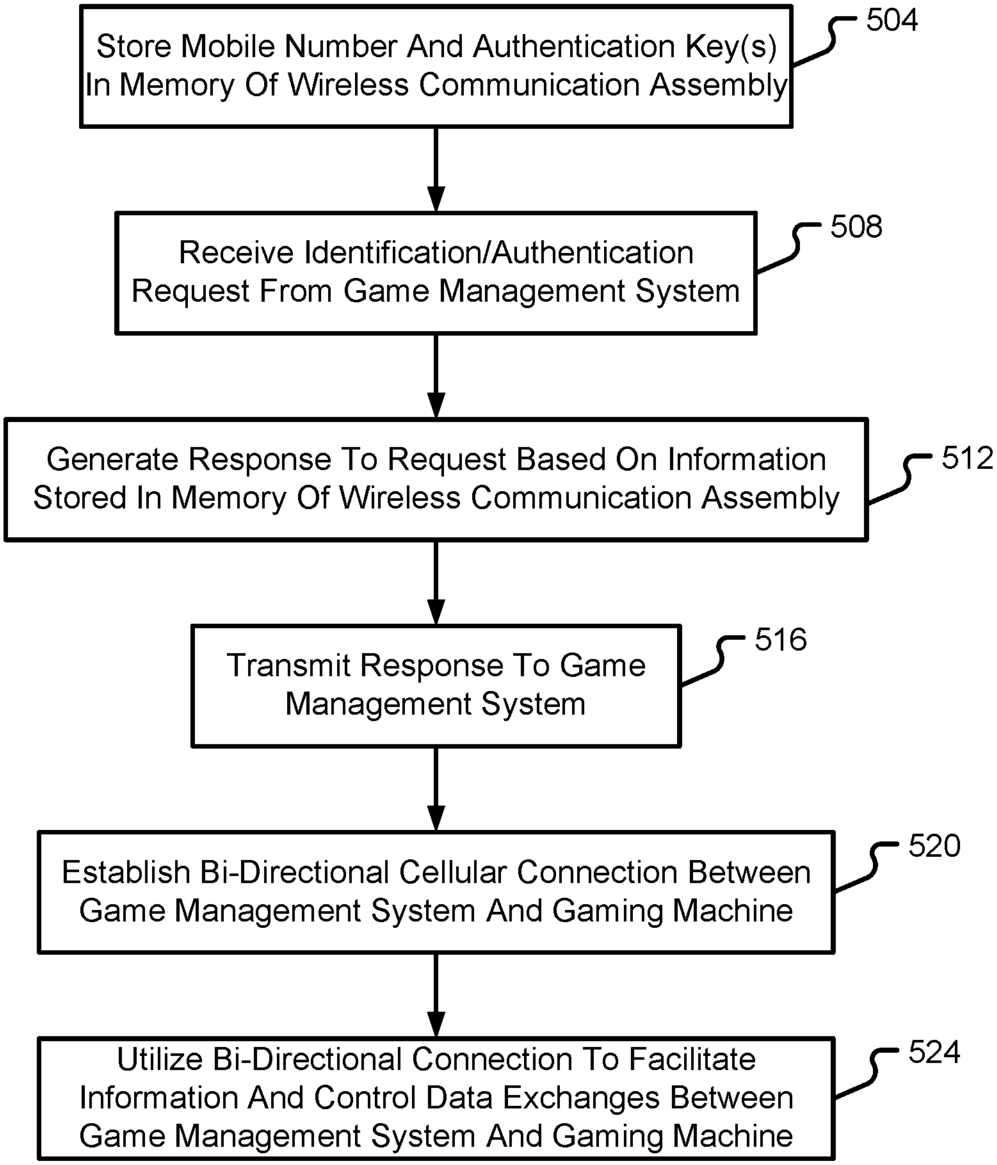
FIG. 5 is a flow diagram depicting a method of establishing and utilizing a bi-directional cellular connection between a gaming machine and cloud-based game management system in accordance with embodiments of the present disclosure.

Referring now to FIG. 5, a method of establishing and utilizing a bi-directional cellular connection between a gaming machine 108 and cloud-based game management system 116 will be described in accordance with embodiments of the present disclosure. The method begins by storing a mobile number and one or more authentication/encryption keys in the assembly memory 290 of the wireless communication assembly 276 (step 504). The method continues when the wireless communication assembly 276 receives an identification/authentication request from the cloud-based game management system 116 (step 508). In some embodiments, the request may be transmitted by the machine identification and authentication instructions of a server 304 in the cloud-based game management system 116.

Upon receiving the request, the wireless communication assembly 276 may be configured to automatically and without input from the processor 204 generate a response to the request (step 512). In some embodiments, the response to the request may be generated by the SIM card 284 and the content of the response may depend upon the information stored in the assembly memory 290. The response may be computed with or include one or both of the mobile number and key(s) stored in assembly memory 290.

Thereafter, the method continues with the wireless communication assembly 276 transmitting the response to the cloud-based game management system 116 (step 512). The response may be transmitted via the wireless communication network 104. It should be appreciated that the identification and authentication process may involve one or multiple sets of challenge and response transmissions. For instance, the cloud-based game management system 116 may issue multiple different types of challenges or requests and the gaming machine 108 may be required to accurately and appropriately respond to each challenge or request to successfully complete the identification and authentication process.

Once a level of trust has been established between the gaming machine 108 and server 304 of the cloud-based game management system 116, the method may continue by establishing a bi-directional cellular connection between the gaming machine 108 and the cloud-based game management system 116 (step 520). The bi-directional connection may traverse the wireless communication network 104 and may further include the wireless connection 132 between the gaming machine 108 and cellular access point 120. The identification and authentication process may also enable the cloud-based game management system 116 to uniquely identify the gaming machine 108 from among other gaming machines 108 in communication with the same cellular access point 120 or with other gaming machines 108 in other locations not serviced by the cellular access point 120.

The method may continue by utilizing the bi-directional connection established in step 520 to facilitate information and control data exchanges between the cloud-based game management system 116 and the gaming machine 108 (step 524). As discussed in connection with FIG. 4, the types of information transmitted from the gaming machine 108 to the cloud-based game management system 116 may include machine state information 220, information from the credit meter 232, gameplay information, and information describing a user 112 of the gaming machine 108. Control data may be transmitted from the cloud-based game management system 116 to the gaming machine 108. Various types of control data that may be transmitted to the gaming machine 108 via the bi-directional connection include, without limitation, updates to game configurations or configuration settings 216, updates for game instructions 208, an output of the RNG 336 to control actions of the game instructions 208, other system updates, and the like. The bi-directional connection may be maintained as long as the gaming machine 108 is in use by a user 112 or as long as the gaming machine 108 is powered up and operational. In other words, the bi-directional connection may be persistent across multiple different gaming sessions of different users 112.

Figure 6:
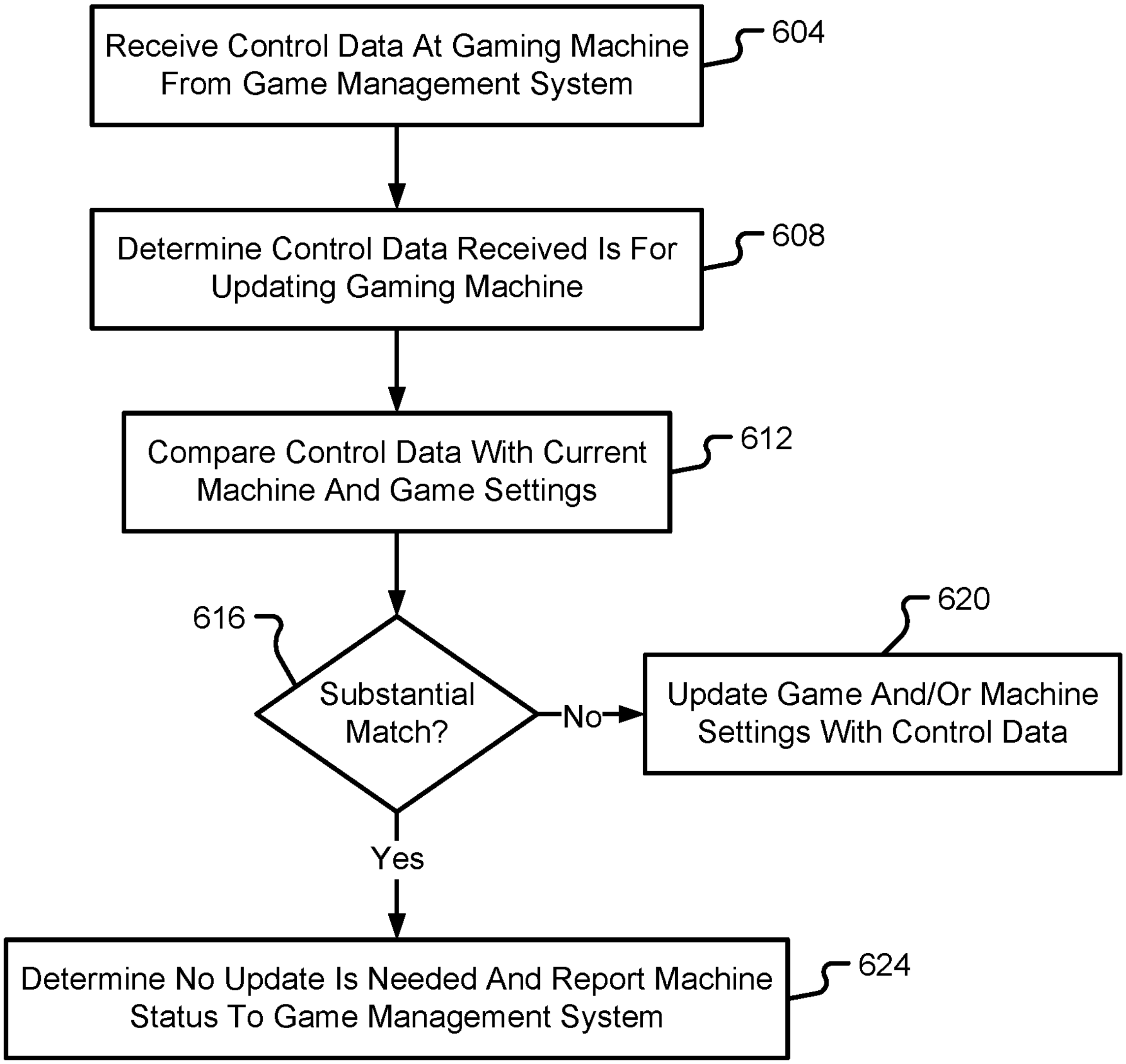
FIG. 6 is a flow diagram depicting a method of updating a gaming machine in accordance with embodiments of the present disclosure.

Referring now to FIG. 6, a method of updating a gaming machine 108 will be described in accordance with embodiments of the present disclosure. The method begins when control data is received at the gaming machine 108 from the cloud-based game management system 116 (step 604). The control data may initially be received at the wireless communication assembly 276 via the antenna 296. The control data may then be decoded and/or demodulated at the modem 292 prior to being transferred to the processor 204 via the second data interface 280 and first data interface 252.

Upon receiving the control data, the processor 204 may determine that the control data includes information to update the gaming machine 108 (step 608). Control data to update a gaming machine 108 may include updates to configuration settings (e.g., sound settings, light settings, animations, graphics, sound effects, etc.), updates to game instructions 208, and/or updates to any other aspect of the gaming machine 108 that impacts a user's 112 interaction or experience with the gaming machine 108.

Upon determining that the control data is for updating the gaming machine 108, the method continues with the processor 204 comparing the control data with settings of the game instructions 208 and/or configuration settings 216 (step 612). If the control data substantially matches the current settings of the gaming machine 108 (step 616), then the method may not require further processing. Rather, the method may terminate because it is determined that no update is needed for the gaming machine 108 to align with the control data (step 624). If such a determination is made, then the activity reporting instructions 212 may report back to the cloud-based game management system 116 that the gaming machine 108 was already up-to-date and there was no need for the control data or an update in accordance with the same.

On the other hand, if the query of step 616 is answered negatively, then the method may continue by updating the game instructions 208 and/or configuration settings 216 as appropriate and in accordance with the control data (step 620).

Figure 7:
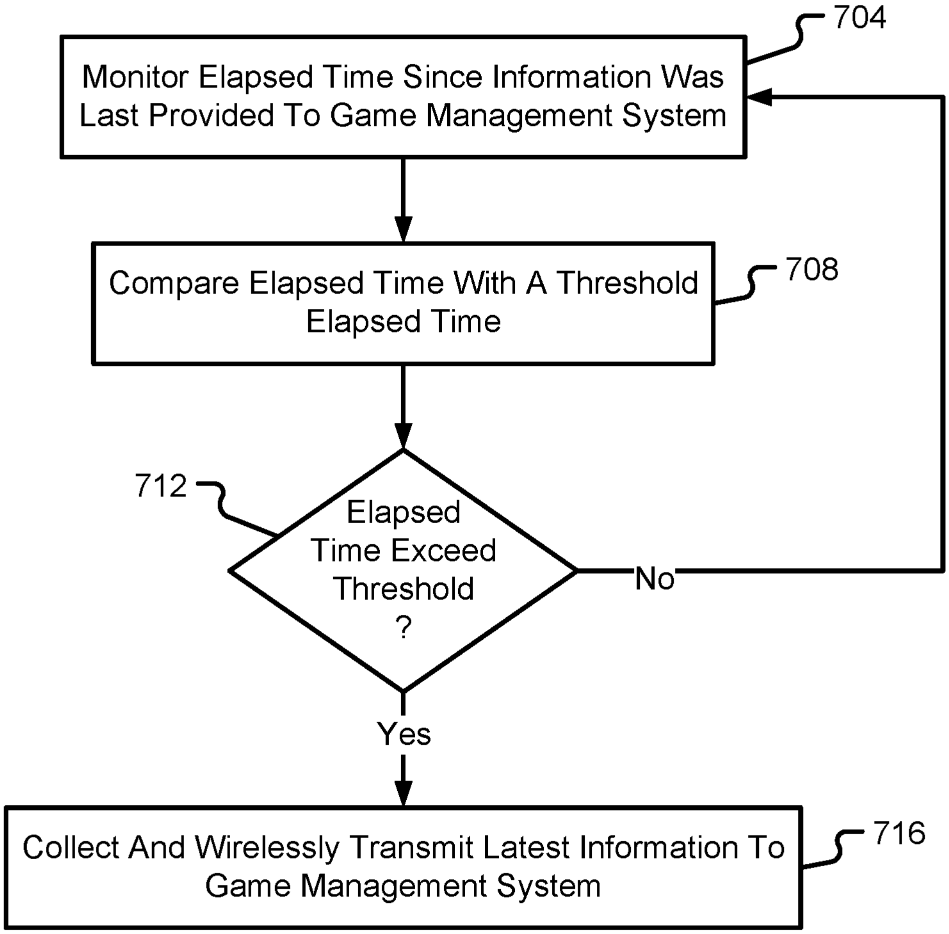
FIG. 7 is a flow diagram depicting a method of determining when to wirelessly report information from a gaming machine to a cloud-based game management system in accordance with embodiments of the present disclosure.

Referring now to FIG. 7, a method of determining when to wirelessly report information from a gaming machine 108 to a cloud-based game management system 116 will be described in accordance with embodiments of the present disclosure. The method may begin with the activity reporting instructions 212 monitoring an elapsed time since the gaming machine 108 last provided information to the game management system (step 704). This monitoring and determination may be made based on any information reporting or may be made for certain types of information. For instance, the activity reporting instructions 212 may be configured to report updates to the credit meter 232 more frequently than updates in gameplay information, even when updates are being provided for a single gaming session of a single user 112.

The method may continue with the activity reporting instructions 212 comparing the elapsed time with a threshold elapsed time (step 708). The activity reporting instructions 212 may then determine whether the elapsed time exceeds the threshold (step 712). If the query of step 712 is answered negatively, then the method returns back to step 704. However, if the query of step 712 is answered positively, then the method may continue with the activity reporting instructions initiating the method depicted and described in connection with FIG. 4. Specifically, the activity reporting instructions 212 may collect information that is desired to be reported then transfer the collected information to the wireless communication assembly 276 via the first data interface 252. The wireless communication assembly 276 may then transmit the received information to the cloud-based game management system 116 (step 716).

Figure 8:
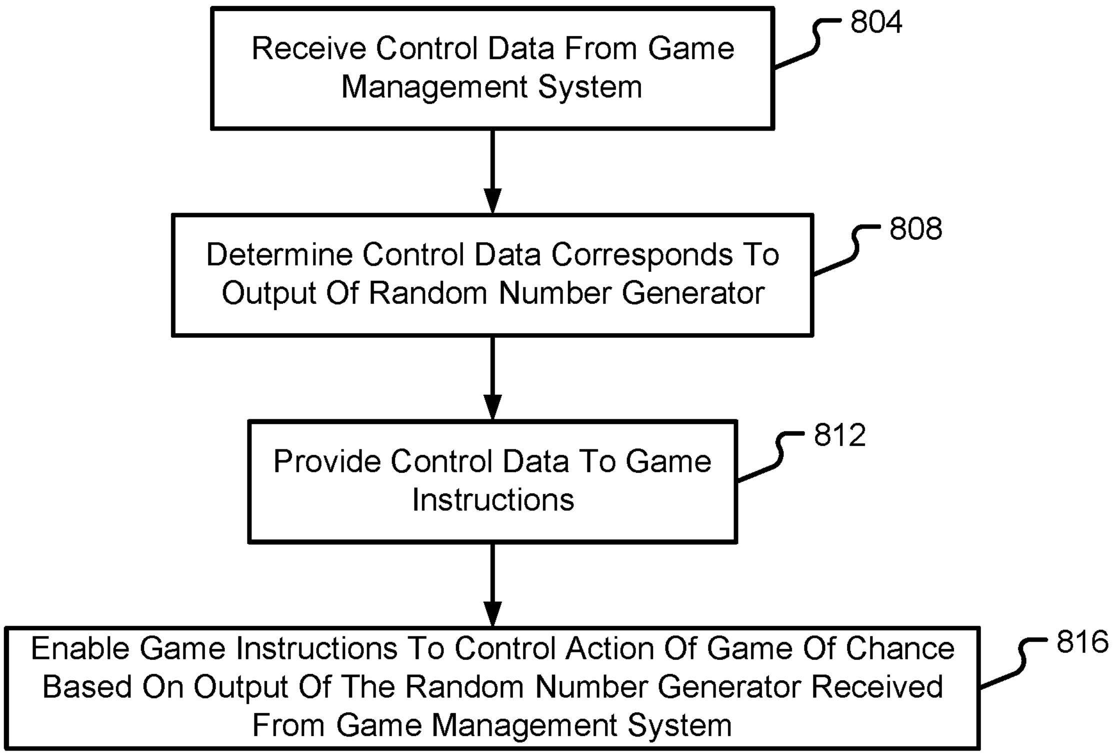
FIG. 8 is a flow diagram depicting a method of enabling a gaming machine to utilize an output of a Random Number Generator (RNG) provided by a cloud-based game management system in accordance with embodiments of the present disclosure.

Referring now to FIG. 8, a method of enabling a gaming machine 108 to utilize an output of an RNG 336 provided by a cloud-based game management system 116 will be described in accordance with embodiments of the present disclosure. Although not depicted, the method may be initiated based on the game instructions 208 providing an output to the cloud-based game management system 116, where the output is based on an event that occurs during execution of the game instructions 208 during a gaming session. The cloud-based game management system 116 may then utilize the RNG 336 to produce an output that is provided back to the gaming machine 108 in the form of control data (step 804). The control data may initially be received at the wireless communication assembly 276, which subsequently transfers the control data to the processor 204 where it is determined that the control data corresponds to an output of the RNG 336 and is to be used by the game instructions 208 (step 808).

The method then continues with the game instructions 208 receiving the output of the RNG 336 (e.g., as control data) (step 812). The game instructions 208 may then be able to control an output of a game of chance based on the output of the RNG 336 received from the cloud-based game management system 116 (step 816). This particular method is useful for the gaming machine 108 because the gaming machine 108 can leverage a remote RNG 336. Thus, hardware and/or software components of the gaming machine 108 do not have to be committed to RNG functions. Additionally, the RNG 336 of a server 304 may be configured to output numbers with a higher degree of "randomness" as compared to an RNG that would be executed at the gaming machine 108.

Figure 9:
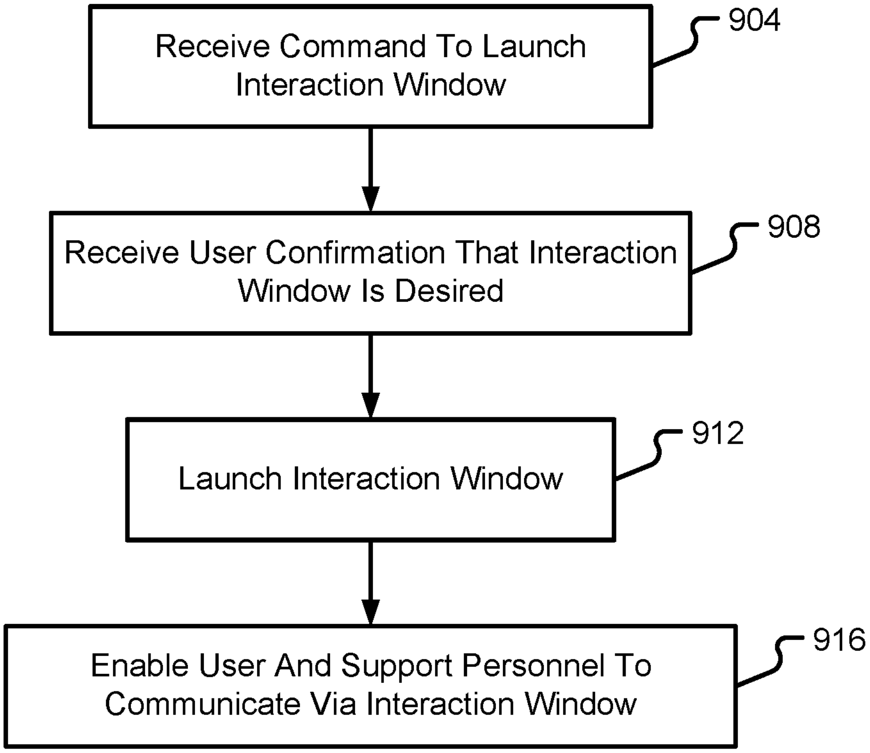
FIG. 9 is a flow diagram depicting a method of enabling a user of a gaming machine to interact with remotely located support personnel in accordance with embodiments of the present disclosure.

Referring now to FIG. 9, a method of enabling a user 112 of a gaming machine 108 to interact with remotely located support personnel will be described in accordance with embodiments of the present disclosure. The method begins when the gaming machine 108 receive a command from the cloud-based game management system 116 to launch an interaction window 904 via a user interface device 272 (step 904). The user interaction window 904 may correspond to a web-based or application-based user interface element that is visually and/or audibly presented to the user 112 via one or multiple user interface devices 112.

Before presenting the interaction window on the gaming machine 108, the communication instructions 228 may query the user 112 as to whether or not the interaction window is acceptable as it may interrupt or disrupt gameplay or interactions with the game instructions 208. The method may continue when the user 112 confirms that the interaction window is desired (step 908). Upon confirming that the interaction window is desired, the communication instructions 228 may launch the interaction window (step 912), which enables the user 112 to communicate with remotely located support personnel (step 916). In some embodiments, the support personnel may be positioned at an administrator terminal 128 and may be allowed to communicate, in real-time, with the user 112. The packets facilitating such real-time communications may be transmitted across the communication network 124, the wireless communication network 104, and/or via the wireless connection 132. The packets may include audio packets, video packets, and/or data packets.

Variants

In some embodiments, because a gaming machine 108 is provided with a wireless communication assembly 276, the gaming machine 108 may be configured to behave as a communication endpoint in a mobile communication network, which may enable certain functionality or capabilities not previously available on a gaming machine 108. For instance, the gaming machine 108 may be configured to communicate with a user's 112 mobile device 140 and a user 112 may be allowed to carry out a communication session with a gaming machine 108 by knowing a mobile number associated with the gaming machine 108. For instance, a user 112 knowing the mobile number of the gaming machine 108 may subscribe to status updates for the gaming machine 108 by calling a number of the gaming machine 108 and then interacting with the system update instructions 236, which enable the user 112 to subscribe to the status updates. The system update instructions 236 may execute a chat bot (to facilitate text-based communications) or may provide a Telephone User Interface (TUI) that provides a menu of options to a user 112 calling the gaming machine 108. When the user 112 successfully places a subscription request (e.g., via navigation of the TUI or based on interactions with the chat bot), the system update instructions 236 may then be configured to monitor for changes in the machine state information 220. When appropriate or defined changes are detected, the system update instructions 236 may further communicate with the number identified in the subscription (e.g., via text, call, chat, email, etc.) to provide the mobile device 140 with information describing the update. In some embodiments, the system update instructions 236 may include AI functionality to facilitate such interactions with a user 112, although AI functionality is not required. Rather, a traditional TUI (or GUI) may be sufficient to achieve the same results of enabling a user 112 to subscribe to machine updates and then provide such updates to the subscribing user 112 when appropriate.

In another illustrative use case, gameplay data and additional data from sensors on the gaming machine 108 may be collected at the gaming machine 108 and then reported to the cloud-based game management system 116. One or more servers 304 of the cloud-based game management system 116 may be configured to analyze the gameplay data and sensor data. The analysis may be used to profile users 112 (possibly anonymously) and identify their gaming preferences. The gaming preferences determined at the cloud-based game management system 116 may be used to control game updates, to recommend games, to modify game characteristics, and/or to facilitate responsible gaming practices.

The cloud-based game management system 116 may also be configured to provide gaming as a service to one or multiple gaming machines 108. In a gaming as a service architecture, the cloud-based game management system 116 may be configured to push new game features to one or multiple gaming machines 108. If the game features are identified as desirable or facilitate preferred gameplay actions, then the features may be kept at the gaming machines 108 and possibly distributed to other gaming machines 108; however, if the features do not achieve the desired or positive gameplay actions, then the features may be removed.

In some embodiments, the cloud-based game management system 116 may be configured to add brand updates to games offered by the game instructions 208 in real time. For instance, new characters may be added for display in a game and the new characters may correspond to characters of a show being performed in the casino where the gaming machine 108 is situated.

In some embodiments, the lifecycle of a game offered by the gaming instructions 208 may be extended because the cloud-based game management system 116 can be used to provide additional game updates, game upgrades, updated content/graphics/etc., modified content, modified game rules, etc. Also, since the updates can be provided remotely and without the need for a technician to physically visit the gaming machine 108, gaming updates become cheaper and easier to implement.

In some embodiments, upcoming game features may be highlighted or teased. In some embodiments, the game management instructions 320 may transmit advertising or teaser content to the gaming machine 108 via the wireless communication network 104.

The cloud-based game management system 116 may also be configured to track help events/requests and update game help menus and features based on an analysis of whether certain help menus resulted in a resolution of the user's 112 problem or question. Specifically, the cloud-based game management system 116 may provide remote help and support and may further enhance the help menus over time based on success of usage.

Because certain capabilities of a gaming machine 108 may be enhanced or augmented by the cloud-based game management system 116, it may also be possible to changes games or game features based on certain variables (e.g., time of day, day of week, weekend vs. weekday, etc.). Moreover, an individual gaming machine 108 may be reconfigured to provide different types of games. For instance, game instructions 208 may be updated to change a machine 108 from providing a game of chance to a game of skill or from a game of chance to a sports betting terminal or lottery terminal. Changes to game type may also be triggered in response to current events. For instance, more gaming machines 108 on a casino floor may be changed to support horse betting in response to determining that all current horse betting terminals are occupied on the casino floor (e.g., because a horse race is occurring or will soon occur).

As another possible variant, the cloud-based game management system 116 may be configured to include one or more pay tables for use by gaming machines 108 or, in particular, game instructions 208 executed by gaming machines 108. The pay tables of the cloud-based game management system 116 may be updated in real time, optimized, and/or verified in real time as user's 112 interact with the games and events are reported from the gaming machines 108 back to the cloud-based game management system 116.

In another variant, embodiments of the present disclosure can enable the cloud-based game management system 116 to initiate downloading/releasing sounds, graphics, animations, etc. remotely via the wireless communication network 104. It may also be possible to speed up the transfer process by using peer-to-peer technology. Other embodiments may also provide seasonal themes such as holiday backgrounds and music. Still further variants of the cloud-based game management system 116 may be configured to change game content based on player profiles (e.g., by identifying a player profile, then changing content). In other embodiments, the cloud-based game management system 116 may be configured to change game content based on time and demand (e.g., offer special bonus exclusive to some happy hours and to a limited number of players).

The present disclosure contemplates a variety of different gaming systems and environments each having one or more of a plurality of different features, attributes, or characteristics. A "gaming system" or "gaming environment" as used herein refers to various configurations of: (a) one or more central servers, central controllers, or remote hosts; (b) one or more electronic gaming machines such as those located on a casino floor; and/or (c) one or more gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more gaming devices in combination with one or more central servers, central controllers, or remote hosts; (c) one or more gaming devices in combination with one or more electronic gaming machines; (d) one or more gaming devices, one or more electronic gaming machines, and one or more central servers, central controllers, or remote hosts in combination with one another; (e) a single electronic gaming machine; (f) a plurality of electronic gaming machines in combination with one another; (g) a single gaming device; (h) a plurality of gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "gaming device" as used herein represents one gaming device or a plurality of gaming devices and, in some embodiments, may include an EGM or multiple EGMs. The use of "server, central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a communication network, the communication network may include a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a communication network, the communication network may include a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the communication network includes a WAN, the gaming system includes a central server, central controller, or remote host and an EGM each located in a different gaming establishment in a same geographic area, such as a same city or a same state. Gaming systems in which the communication network includes a WAN are substantially identical to gaming systems in which the communication network includes a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a communication network, the communication network may include an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PUP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. An electronic gaming machine, comprising:

a user interface device;

a processor coupled with the user interface device;

a wireless communication assembly;

a computer-readable storage medium coupled with the processor and comprising instructions that:

enable a user to interact with a game via the user interface device;

update machine state information as the user interacts with the game;

store the updated machine state information while the user interacts with the game;

determine one of: (i) a predetermined amount of time has passed since the machine state information has been shared with a cloud-based game management system and (ii) the machine state information has changed with respect to a particular state; and in response to determining that the one of the predetermined amount of time has passed and the machine state information has changed with respect to the particular state, executing activity reporting instructions to provide the updated machine state information to the cloud-based game management system via the wireless communication assembly;

wherein the wireless communication assembly comprises:

a data interface that receives, from the processor, the updated machine state information;

memory that temporarily stores the updated machine state information; and an antenna that wirelessly transmits the updated machine state information to the cloud-based game management system.

2. The electronic gaming machine of claim 1, wherein the wireless communication assembly further comprises:

a Subscriber Identification Module (SIM) card that stores a mobile number associated with the wireless communication assembly and a key, wherein the mobile number and the key are used by the wireless communication assembly to enable the cloud-based game management system to identify and authenticate the electronic gaming machine from among other electronic gaming machines.

3. The electronic gaming machine of claim 2, wherein the wireless communication assembly communicates with the cloud-based game management system via a cellular connection and wherein control data is provided from the cloud-based game management system to the wireless communication assembly via the cellular connection.

4. The electronic gaming machine of claim 3, wherein the control data comprises game configuration data, wherein the game configuration data is communicated from the wireless communication assembly to the processor via the data interface, and wherein the computer-readable storage medium further comprises instructions that:

update the game of chance based on the game configuration data received from the wireless communication assembly.

5. The electronic gaming machine of claim 3, wherein the control data comprises an output of a Random Number Generator (RNG) and wherein the output of the RNG is provided from the cloud-based game management system to the processor to control an action of the game.

6. The electronic gaming machine of claim 1, wherein the updated machine state information is transmitted in response to determining that the predetermined amount of time has passed since the machine state information has been shared with the cloud-based game management system.

7. The electronic gaming machine of claim 1, wherein the updated machine state information is transmitted in response to determining that the machine state information has changed with respect to the particular state.

8. The electronic gaming machine of claim 7, wherein the machine state information is changed in response to the machine state changing into the particular state.

9. The electronic gaming machine of claim 7, wherein the machine state information is changed in response to the machine state changing out of the particular state.

10. The electronic gaming machine of claim 7, wherein the particular state comprises one of available and in use.

11. The electronic gaming machine of claim 1, wherein the machine state information describes one of: whether the user is currently interacting with the game, an amount of time that the user has been interacting with the game, whether the electronic gaming machine is currently sitting idle, and betting levels of the user.

12. The electronic gaming machine of claim 1, wherein the computer-readable storage medium further comprises:

instructions that enable the user to login to the cloud-based game management system prior to interacting with the game; and instructions that transmit player profile information to the wireless communication assembly for further transmission to the cloud-based game management system when the user is logging into the cloud-based game management system.

13. The electronic gaming machine of claim 1, wherein the computer-readable storage medium further comprises instructions that:

present, via the user interface device, an interaction window that facilitates communications between the user and support personnel located remotely with respect to the electronic gaming machine, wherein communication data exchanged between the user and the support personnel passes through the data interface and the antenna.

14. The electronic gaming machine of claim 1, wherein the data interface comprises a bi-directional data interface and wherein system updates are received at the antenna from the cloud-based game management system and then provided to the processor via the bi-directional data interface to enable the processor to update the electronic gaming machine with the system updates.

15. A system, comprising:

a first data interface;

a processor coupled with the first data interface;

a computer-readable storage medium coupled with the processor and comprising instructions stored thereon that are executable by the processor, wherein the instructions comprise instructions that:

enable a user to interact with a game via a user interface device;

update machine state information as the user interacts with the game;

store the updated machine state information while the user interacts with the game;

determine one of: (i) a predetermined amount of time has passed since the machine state information has been shared with a cloud-based game management system and (ii) the machine state information has changed with respect to a particular state; and in response to determining that the one of the predetermined amount of time has passed and the machine state information has changed with respect to the particular state, executing activity reporting instructions to provide the updated machine state information to the cloud-based game management system; and a wireless communication assembly, comprising:

a second data interface that receives the updated machine state information;

memory that stores the updated machine state information; and an antenna that wirelessly transmits the updated machine state information to the cloud-based game management system.

16. The system of claim 15, further comprising:

a data transmission medium that couples the first data interface with the second data interface; and a Subscriber Identification Module (SIM) card that stores a mobile number associated with the wireless communication assembly and a key, wherein the mobile number and the key are used for identification and authentication with the cloud-based game management system.

17. The system of claim 16, wherein the wireless communication assembly communicates with the cloud-based game management system via a cellular connection and wherein control data is provided from the cloud-based game management system to the wireless communication assembly via the cellular connection.

18. The system of claim 15, wherein the machine state information describes one of: whether the user is currently interacting with the game, an amount of time that the user has been interacting with the game, whether the game is idle, and betting levels of the user.

19. A method of operating an electronic gaming machine, the method comprising:

enabling a user to interact with a game via a user interface device;

determining that machine state information has been updated;

determining one of: (i) a predetermined amount of time has passed since the machine state information has been shared with a cloud-based game management system and (ii) the machine state information has been updated with respect to a particular state; and in response to determining that the one of the predetermined amount of time has passed and the machine state information has changed with respect to the particular state, providing the updated machine state information from a processor to a wireless communication assembly; and wirelessly transmitting, with the wireless communication assembly, the updated machine state information to the cloud-based game management system.

20. The method of claim 19, further comprising:

storing, with a Subscriber Identification Module (SIM) card, a mobile number associated with the wireless communication assembly and a key; and authenticating the electronic gaming machine with the mobile number and the key.

* * * * *